(12) United States Patent
Mishra et al.

(10) Patent No.: US 12,050,563 B2
(45) Date of Patent: Jul. 30, 2024

(54) METHOD AND SYSTEM FOR SCALABLE ACCELERATION OF DATA PROCESSING PIPELINE

(71) Applicant: Tata Consultancy Services Limited, Mumbai (IN)

(72) Inventors: Mayank Mishra, Thane West (IN); Archisman Bhowmick, Thane West (IN); Rekha Singhal, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 49 days.

(21) Appl. No.: 18/049,363

(22) Filed: Oct. 25, 2022

(65) Prior Publication Data
US 2023/0185778 A1    Jun. 15, 2023

(30) Foreign Application Priority Data
Dec. 14, 2021 (IN) .............................. 202121058260

(51) Int. Cl.
*G06F 17/00* (2019.01)
*G06F 7/00* (2006.01)
*G06F 16/21* (2019.01)

(52) U.S. Cl.
CPC .................................. *G06F 16/211* (2019.01)

(58) Field of Classification Search
CPC ....................................................... G06F 16/211
(Continued)

(56) References Cited

U.S. PATENT DOCUMENTS 9,323,651 B2    4/2016  Garrett et al.
2007/0156420 A1*  7/2007  Meier ................. G06Q 10/06
                                                          703/22
(Continued)

OTHER PUBLICATIONS

Huangshi Tian et al., CrystalPerf: Learning to Characterize the Performance of Dataflow Computation through Code Analysis, Computer Science, 2021, vol. 13, Semantic Scholar, https://www.usenix.org/system/files/atc21-tian.pdf.
(Continued)

*Primary Examiner* — Pavan Mamillapalli
(74) *Attorney, Agent, or Firm* — FINNEGAN, HENDERSON, FARABOW, GARRETT & DUNNER LLP

(57) ABSTRACT

The present disclosure provides a scalable acceleration of data processing in Machine Learning pipeline which is unavailable in conventional methods. Initially, the system receives a dataset and a data processing code. A plurality of sample datasets are obtained based on the received dataset using a sampling technique. A plurality of performance parameters corresponding to each of the plurality of sample datasets are obtained based on the data processing code using a profiling technique. A plurality of scalable performance parameters corresponding to each of a plurality of larger datasets are predicted based on the plurality of performance parameters and the data processing code using a curve fitting technique. Simultaneously, a plurality of anti-patterns are located in the data processing code using a pattern matching technique. Finally, an accelerated code is recommended based on the plurality of anti-patterns and the predicted plurality of scalable performance parameters using an accelerated code recommendation technique.

6 Claims, 9 Drawing Sheets

(58) Field of Classification Search
USPC .......................................................... 707/769
See application file for complete search history.

(56) References Cited

U.S. PATENT DOCUMENTS

| | | | |
|---|---|---|---|
| 2011/0091017 A1* | 4/2011 | Friedlander | H05G 1/265 |
| | | | 378/146 |
| 2012/0060142 A1 | 3/2012 | Fliess et al. | |
| 2014/0013311 A1* | 1/2014 | Garrett | G06F 11/3688 |
| | | | 717/128 |
| 2015/0347268 A1* | 12/2015 | Garrett | G06F 8/443 |
| | | | 714/47.2 |
| 2016/0314064 A1* | 10/2016 | Moretto | H04L 43/55 |
| 2018/0211153 A1* | 7/2018 | Hunt | G06N 5/047 |
| 2020/0097845 A1* | 3/2020 | Shaikh | G06Q 30/0201 |
| 2020/0210769 A1* | 7/2020 | Hou | G06F 18/211 |

OTHER PUBLICATIONS

Chao Yu et al., "LWPTool: A Lightweight Profiler to Guide Data Layout Optimization," IEEE Explore, 2018, IEEE, https://ieeexplore.ieee.org/ielaam/71/8486815/8367889-aam.pdf.

* cited by examiner

METHOD AND SYSTEM FOR SCALABLE ACCELERATION OF DATA PROCESSING PIPELINE

PRIORITY CLAIM

This U.S. patent application claims priority under 35 U.S.C. § 119 to: Indian Patent Application No. 202121058260, filed on Dec. 14, 2021. The entire contents of the aforementioned application are incorporated herein by reference.

TECHNICAL FIELD

The disclosure herein generally relates to the field of big data and, more particular, to a method and system for scalable acceleration of data processing pipeline.

BACKGROUND

Machine Learning (ML) is a data-driven approach and is widely used to automate applications. Data pre-processing is a key step in data-driven approaches especially in (ML) pipeline. The data pre-processing includes data cleaning, data transformation, data joins, data visualization for feature identification, and finally, building features for model training. Generally, the data pre-processing consumes more time in the development cycle of ML pipeline.

Conventionally, data pre-processing operations are implemented using a programming language and are tested for functional correctness and performance compliance using a dataset of smaller size. However, most of the performance bottlenecks are invisible when tested with smaller sized dataset. Therefore, the performance issues emerges when these pre-processing operations are executed on datasets of larger sizes (for example, rows in billion or trillion). In such cases, approach followed by programmers is to freeze the ML pipeline and fix the performance degradation by adding additional hardware or by changing some portion of programming code using static analysis. This may lead to an increase in data pre-processing time. Thus, existing method have limitations in detecting these bottlenecks early, on smaller data sets, which is a hurdle in creating preventive solutions to overcome challenges.

SUMMARY

Embodiments of the present disclosure present technological improvements as solutions to one or more of the above-mentioned technical problems recognized by the inventors in conventional systems. For example, in one embodiment, a method for scalable acceleration of data processing pipeline is provided. The method includes receiving, by one or more hardware processors, a dataset and a data processing code, wherein the data processing code is implemented to transform the dataset from one format to another. Further, the method includes obtaining, by one or more hardware processors, a plurality of sample datasets based on the received dataset and a predefined data sampling size using a sampling technique. Furthermore, the method includes obtaining, by one or more hardware processors, a plurality of performance parameters corresponding to each of the plurality of sample datasets based on the data processing code using a first profiling technique. Furthermore, the method includes predicting, by one or more hardware processors, a plurality of scalable performance parameters corresponding to each of a plurality of larger datasets based on the plurality of performance parameters and the data processing code using a curve fitting technique. Furthermore, the method includes simultaneously locating, by one or more hardware processors, a plurality of anti-patterns in the data processing code using a pattern matching technique, wherein an anti-pattern is a short term solution prone to adverse consequences during a long term usage. Finally, the method includes recommending, by one or more hardware processors, a plurality of accelerated codes based on the plurality of anti-patterns and the predicted plurality of scalable performance parameters using an accelerated code recommendation technique, wherein the accelerated code recommendation technique identifies a plurality of super-linear bottlenecks from the plurality of anti-patterns and recommends the corresponding accelerated code.

In another aspect, a system for scalable acceleration of data processing pipeline is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a dataset and a data processing code, wherein the data processing code is implemented to transform the dataset from one format to another. Further, the one or more hardware processors are configured by the programmed instructions to obtain a plurality of sample datasets based on the received dataset and a predefined data sampling size using a sampling technique. Furthermore, the one or more hardware processors are configured by the programmed instructions to obtain a plurality of performance parameters corresponding to each of the plurality of sample datasets based on the data processing code using a first profiling technique. Furthermore, the one or more hardware processors are configured by the programmed instructions to predict a plurality of scalable performance parameters corresponding to each of a plurality of larger datasets based on the plurality of performance parameters and the data processing code using a curve fitting technique. Furthermore, the one or more hardware processors are configured by the programmed instructions to simultaneously locate a plurality of anti-patterns in the data processing code using a pattern matching technique, wherein an anti-pattern is a short term solution prone to adverse consequences during a long term usage. Finally, the one or more hardware processors are configured by the programmed instructions to recommend a plurality of accelerated codes based on the plurality of anti-patterns and the predicted plurality of scalable performance parameters using an accelerated code recommendation technique, wherein the accelerated code recommendation technique identifies a plurality of super-linear bottlenecks from the plurality of anti-patterns and recommends the corresponding accelerated code.

In yet another aspect, a computer program product including a non-transitory computer-readable medium having embodied therein a computer program for scalable acceleration of data processing pipeline is provided. The computer readable program, when executed on a computing device, causes the computing device to receive a dataset and a data processing code, wherein the data processing code is implemented to transform the dataset from one format to another. Further, computer readable program, when executed on a computing device, causes the computing device to obtain a plurality of sample datasets based on the received dataset and a predefined data sampling size using a sampling technique. Furthermore, computer readable program, when executed on a computing device, causes the computing device to obtain a plurality of performance parameters corresponding to each of the plurality of sample datasets based on the data processing code using a first profiling technique. Furthermore, computer readable program, when executed on a computing device, causes the computing device to predict a plurality of scalable performance parameters corresponding to each of a plurality of larger datasets based on the plurality of performance parameters and the data processing code using a curve fitting technique. Furthermore, computer readable program, when executed on a computing device, causes the computing device to simultaneously locate a plurality of anti-patterns in the data processing code using a pattern matching technique, wherein an anti-pattern is a short term solution prone to adverse consequences during a long term usage. Finally, computer readable program, when executed on a computing device, causes the computing device to recommend a plurality of accelerated codes based on the plurality of anti-patterns and the predicted plurality of scalable performance parameters using an accelerated code recommendation technique, wherein the accelerated code recommendation technique identifies a plurality of super-linear bottlenecks from the plurality of anti-patterns and recommends the corresponding accelerated code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
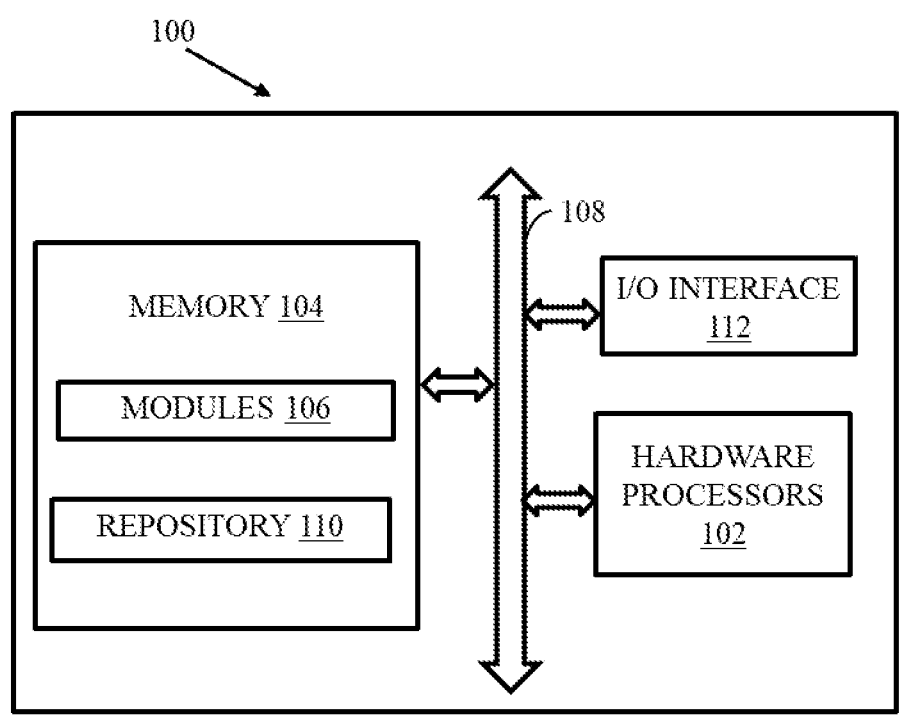
FIG. 1 is a functional block diagram of a system for scalable acceleration of data processing pipeline, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for scalable acceleration of data processing pipeline by automatically recommending accelerated codes to be used for larger data sizes. Initially, the system receives a dataset and a data processing code. The data processing code is implemented to transform the dataset from one format to another. Further, a plurality of sample datasets are obtained based on the received dataset and a predefined data sampling size using a sampling technique. After sampling, a plurality of performance parameters corresponding to each of the plurality of sample datasets are obtained based on the data processing code using a profiling technique. After profiling, a plurality of scalable performance parameters corresponding to each of a plurality of larger datasets are predicted based on the plurality of performance parameters and the data processing code using a curve fitting technique. Simultaneously, a plurality of anti-patterns are located in the data processing code using a pattern matching technique. An anti-pattern is a short term solution prone to adverse consequences during long term usage. Finally, a plurality of accelerated codes are recommended based on the plurality of anti-patterns and the predicted plurality of scalable performance parameters using an accelerated code recommendation technique. The accelerated code recommendation technique identifies a plurality of super-linear bottlenecks from the plurality of anti-patterns and recommends the corresponding accelerated code.

Referring now to the drawings, and more particularly to FIGS. 1 through 5E, where similar reference characters denote corresponding features consistently throughout the figures, there are shown preferred embodiments and these embodiments are described in the context of the following exemplary system and/or method.

FIG. 1 is a functional block diagram of a system 100 for scalable acceleration of data processing pipeline, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for scalable acceleration of data processing pipeline. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for scalable acceleration of data processing pipeline. In an embodiment, plurality of modules 106 includes a sampling module (shown in FIG. 4), a profiling module (shown in FIG. 4), a prediction module (shown in FIG. 4), an anti-pattern identification module (shown in FIG. 4) and an accelerated code recommendation module (shown in FIG. 4).

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 2:
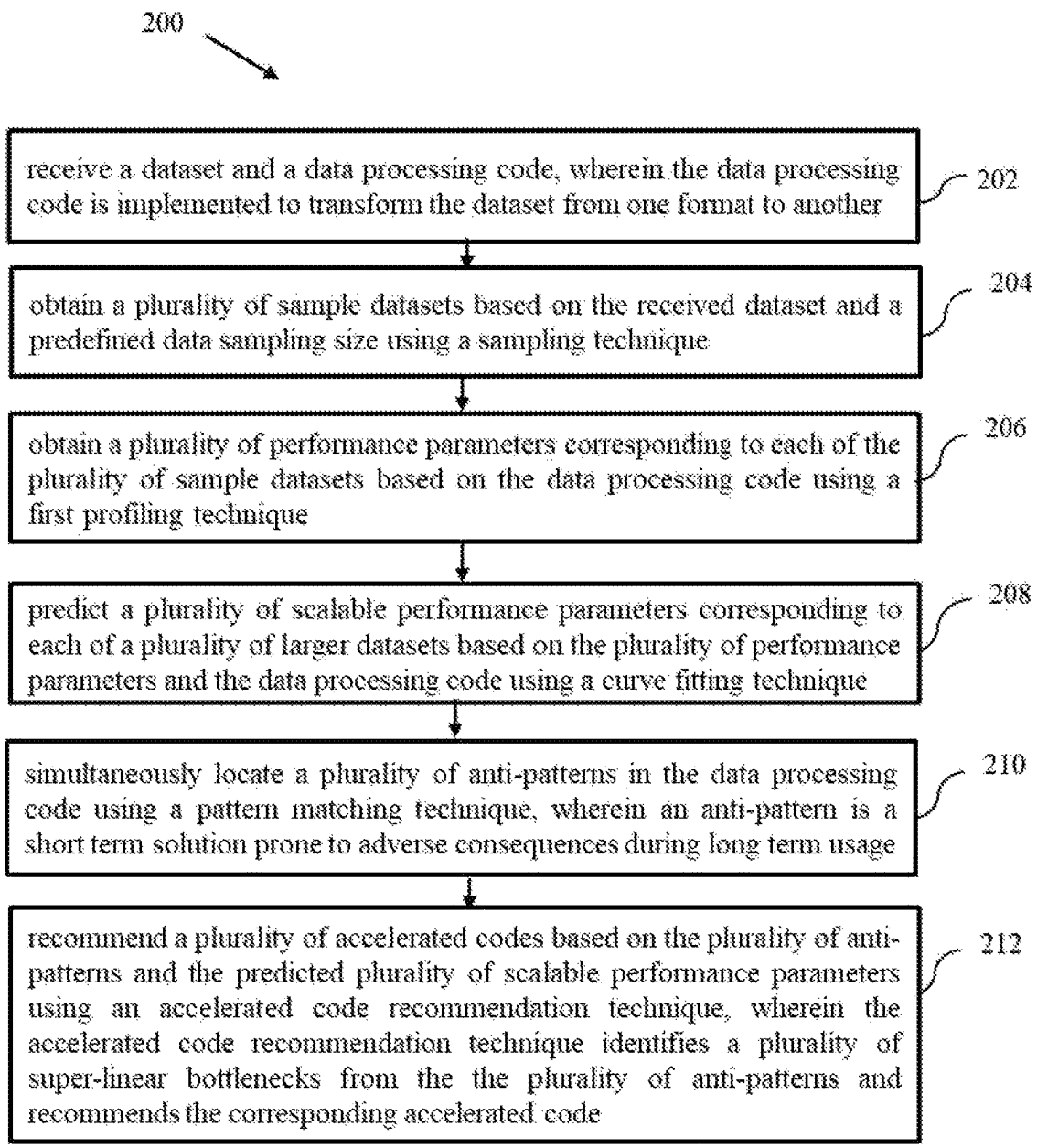
FIG. 2 is an exemplary flow diagram illustrating a method for scalable acceleration of data processing pipeline, implemented by the system of FIG. 1, in accordance with some embodiments of the present disclosure.

FIG. 2 is an exemplary flow diagrams illustrating a method 200 for scalable acceleration of data processing pipeline implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIGS. 2A and 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive a dataset and a data processing code, wherein the data processing code is implemented to transform the dataset from one format to another. In an embodiment, the data processing code is a data pre-processing code used in automated ML pipelines.

At step 204 of the method 200, the sampling module executed by the one or more hardware processors 102 is configured by the programmed instructions of to obtain the plurality of sample datasets based on the received dataset and a predefined data sampling size (data size) using a sampling technique. In an embodiment, the predefined data sampling size is larger than the size of cache memory. In an embodiment, the predefined data sampling size refers to a data size reduction factor. For example, if k denotes the data size reduction factor, then $$k \in \left(1, \frac{1}{2}, \frac{1}{4}, \frac{1}{8}, \frac{1}{16}, ...\right).$$

In an embodiment, the sampling technique used in the present disclosure is a random sampling without replacement. For temporal data, the sample technique preserves the temporal order of individual data points.

At step 206 of the method 200, the profiling module executed by the one or more hardware processors 102 is configured by the programmed instructions to obtain the plurality of performance parameters corresponding to each of the plurality of sample datasets based on the data processing code using a first profiling technique. In an embodiment, the plurality of performance parameters includes a computing time, a memory transfer time, a number of processor cores, a cache memory hierarchy, a cache size and a memory bandwidth. The plurality of performance parameters are alternatively represented as "profile".

In an embodiment, the first profiling technique includes Scalene, cProfiler, mProfiler, and the like. The output of the profiling technique is in a tuple form. For example, the tuple form is <file name, line number, data size, compute time, memory transfer time>. The tuple mentioned above is generated for every line of data processing code on a particular input data size. The list of such tuples for the complete data processing code for a particular data size is termed as the "profile" of the code. The profile is denoted by $P_k$ (processing profile), where, k denotes the data size reduction factor and $$k \in \left(1, \frac{1}{2}, \frac{1}{4}, \frac{1}{8}, \frac{1}{16}, \ldots\right).$$

At step 208 of the method 200, the prediction module executed by the one or more hardware processors 102 is configured by the programmed instructions to predict the plurality of scalable performance parameters corresponding to each of a plurality of larger datasets based on the plurality of performance parameters and the data processing code using a curve fitting technique. In an embodiment, the plurality of scalable performance parameters includes a scalable computing time and a scalable memory transfer time. In an embodiment, the curve fitting technique used in the present disclosure includes scipy. optimize.curve fit and numpy.polyfit. The curve fitting techniques build models for predicting the processing time and assess the scalability bottlenecks when data size is increased. The present disclosure considers only positive polynomial, exponential, and logarithmic functions for curve fitting as the processing time of any data processing program increases monotonically with an increase in data size.

The process of curve fitting is explained as follows: Given k tuples $(s_i, t_i)$, where $i \in (1, 2, \ldots, k)$ and $s_i$, $t_i$ denoting the data size and processing time for $i^{th}$ tuple, curve fitting is performed using a set of mathematical functions F. The mathematical function $f$, where $f \in F$ results in the least fitting error, is selected as the representative curve function for the given tuples. The function $f$ can then be utilized to predict the processing time for data sizes larger than the sizes for which the input tuples are provided. Table I shows the predicted processing time values derived using the mentioned approach.

In an embodiment, the scalable processing time (the scalable computing time) and memory usage (the scalable memory transfer time) is computed for every line of the code based on the profiles $Pr_k$ (predicted profile) for different values of k. The curve fitting techniques considers other parameters in the profiles $P_k$ like the number of cores, the cache hierarchy, the cache size and the memory bandwidth. Further, the processing time as well as the memory utilization for larger data sizes, i.e., $$k \in \left(1, \frac{1}{2}, \frac{1}{4}, \frac{1}{8}, \frac{1}{16}, \ldots\right)$$

are predicted (called predicted profiles or the plurality of scalable performance parameters).

For example, Table I shows the processing time profiles $P_k$ as well as their predicted profiles $Pr_k$ associated with an ML pipeline including several data processing operations like Op1, Op2, and Op3. The Table 1 shows that processing time taken by all three operations increases with an increase in data size. However, the rate of increase is different for each operation. Op1 consumes the highest processing time (20 sec) among the three (twice that of Op2 and thrice that of Op3) when data size is n/8, however, when data size is increased to n, Op2 starts taking four times more time than Op1. The ratio between the processing times taken by Op1 and Op3 is reduced to 1.3 when data size was n from the earlier ratio of 3 when data size was n/8. The n (data size) in this example is 500 k, which is about the 5% sample of the whole dataset made available.

TABLE I

| Bottleneck | Observed Time (Sec) | | | | Predicted Time (Sec) | | |
| --- | --- | --- | --- | --- | --- | --- | --- |
| | $P_{n/8}$ | $P_{n/4}$ | $P_{n/2}$ | $P_n$ | $Pr_{2n}$ | $Pr_{4n}$ | $Pr_{16n}$ |
| Op1 | 20 | 34 | 50 | 77 | 114 | 168 | 358 |
| Op2 | 9.6 | 23 | 81 | 327 | 1350 | 5600 | 97000 |
| Op3 | 6.7 | 11 | 24 | 60 | 158 | 425 | 3150 |

Figure 3:
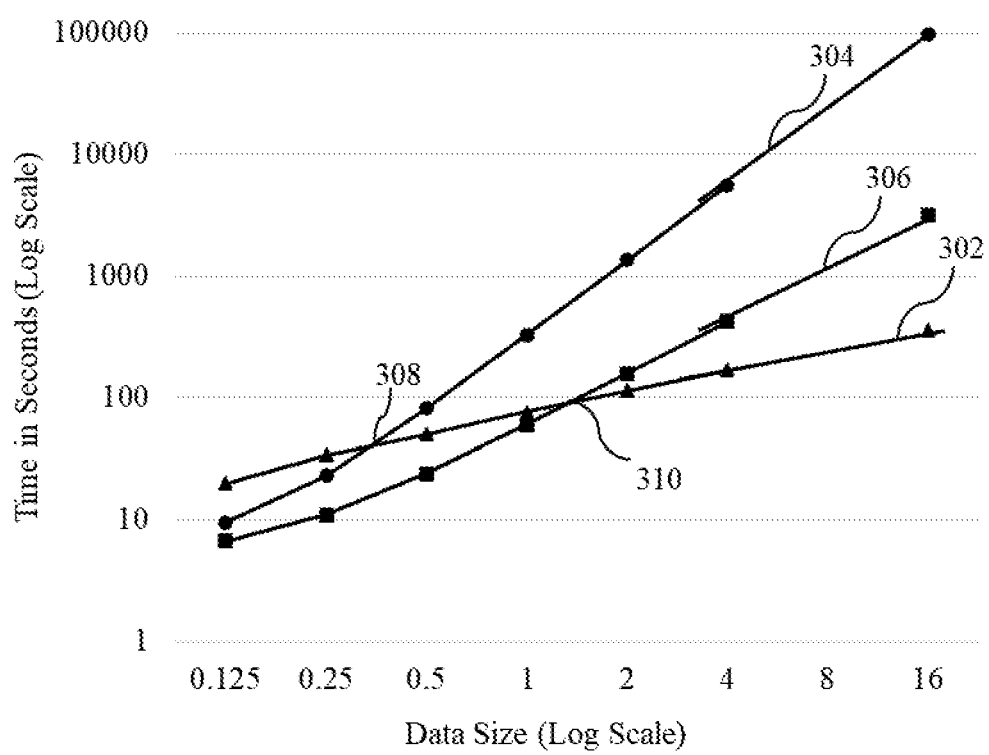
FIG. 3 illustrates a bottleneck inversion problem experienced by conventional methods, in accordance with some embodiments of the present disclosure.

FIG. 3 illustrates the bottleneck inversion problem given in Table I for the method for scalable acceleration of data processing pipeline, implemented by the system of FIG. 1, in accordance with some embodiments of the present disclosure. Now referring to FIG. 3, both X axis represents the data size and the Y axis represents time in seconds. Both the X axis and Y axis are in log domains. FIG. 3 shows that the bottlenecks change with data size. The line graphs 302, 304 and 306 indicates the variation in time corresponding to the variation data size associated with Op1, Op2, and Op3 respectively. The points 308 and 310 are called the bottleneck inversion points. The piece of code which is the biggest bottleneck Op1 when data size is n/8 (denoted as 0.125 in the graph) is predicted to be the smallest bottleneck when data size reaches its actual value 16×n (8 to 10 Million data points). This changing bottleneck problem as is called as Bottleneck Inversion Problem.

At step 210 of the method 200, the anti-pattern identification module executed by the one or more hardware processors 102 is configured by the programmed instructions to simultaneously locate the plurality of anti-patterns in the data processing code using a pattern matching technique. An anti-pattern is a short term solution, prone to adverse consequences during long term usage. In an embodiment, the pattern matching includes a regular expression based pattern matching and a keyword based pattern matching.

For example, the plurality of anti-patters includes, loops, dead code, lambda functions, file I/O operations, and data frame operations. The pattern matching technique uses regular expressions and keyword searches for finding bad code designs referred to as Anti-pattern finder, which is a modular script. The pattern matching technique can be extended for new anti-patterns. The pattern matching technique (anti-pattern finder) provides the locations of the found anti-patterns in the form of a list of tuples (location metadata). This list of tuples is called "Anti-pattern list (APL)" is of the form <file name, line number, antipattern type>. For example, <file1_preprocess.py, 24, ITER> where ITER refers to antipattern type where "iterrows" operation is used with data frames. Example of ITER antipattern is present in Tables III. Another example is <file2_preprocess.py, 96, MEM>, where MEM refers to repeated data operation antipattern. Example of MEM antipattern is present in Table VI.

At step 212 of the method 200, the accelerated code recommendation module executed by the one or more hardware processors 102 is configured by the programmed instructions to recommend the plurality of accelerated codes based on the plurality of anti-patterns and the predicted plurality of scalable performance parameters using an accelerated code recommendation technique. The accelerated code recommendation technique identifies a plurality of super-linear bottlenecks from the plurality of anti-patterns and recommends the corresponding accelerated code.

In an embodiment, the method of recommending the accelerated code based on the plurality of anti-patterns and the predicted plurality of scalable performance parameters using the accelerated code recommendation technique receives the plurality of scalable performance parameters corresponding to each of the plurality of larger datasets and the plurality of anti-patterns. Further, a plurality of performance bottlenecks associated with the data processing code are identified based on the plurality of scalable performance parameters and the located plurality of anti-patterns using a second profiling technique. In an embodiment, the second profiling technique includes Scalene, cProfiler, mProfiler, and the like. Each of the plurality of performance bottlenecks are identified based on a change in computing time (or change in memory requirement) corresponding to an increase in data size. After identifying the plurality of performance bottlenecks, a plurality of super-linear bottlenecks are selected from the plurality of performance bottlenecks by sorting the plurality of performance bottlenecks in descending order based on a corresponding computing time. The plurality of performance bottlenecks with the computing time greater than a predefined threshold are selected as the plurality of super-linear bottlenecks. Each of the plurality of super-linear bottlenecks causes scalability problem. Finally, the plurality of accelerated codes corresponding to each of the plurality of super-linear bottlenecks are recommended based on an accelerated code lookup table. The accelerated code lookup table comprises the plurality of bottlenecks and the plurality of accelerated codes corresponding to each of the plurality of bottlenecks. For example, Tables III through Table VII illustrates some of the example super-linear bottlenecks and the corresponding accelerated codes.

In an embodiment, each line of code of the processing code is categorized as either "at-most-linear" or "super-linear" depending on how the processing time changes when data size is increased. The lines of code categorized as "super-linear" are the ones that cause the scalability problem. When the data size is small, such super-linear bottlenecks' processing time or memory requirement might be relatively lesser than other (even linear) bottlenecks. However, for the larger data sizes, the super-linear bottlenecks can surpass other bottlenecks in time and resources required for processing. The operation Op2 in graph shown in Table I is one such super-linear bottleneck.

In an embodiment, the processing code associated with the each of the plurality of crucial performance bottlenecks is replaced with an efficient code (accelerated code). This code replacement can change the bottleneck's nature from super-linear to at most linear, wherein such cases occur due to sub-optimal coding. However, in certain embodiments, it is impossible to change the bottleneck's nature and such cases occur when the algorithm involved is super-liner in nature. In such cases, replacing individual operations such as 'loop iteration' with unrolled loops, simple instructions to vectorized instructions, and converting lists to arrays can reduce the bottleneck's absolute processing time and memory requirement. The nature of the bottleneck might remain the same (super-linear). However, the curve is pushed for larger data sizes which may be well beyond the size of total data used.

In an embodiment, replacing the code snippet associated with the each of the plurality of crucial performance bottlenecks with efficient and faster operations (accelerated code) accelerates the overall data processing operation. Although at-most-linear bottlenecks are not as severe as scalability bottlenecks, still reducing their processing time and memory requirement reduces the overall processing time and memory requirement of the data processing.

Table II provides a glimpse of accelerations achieved by the present disclosure for the anti-patterns over a data frame containing 500 k data points. Table II represents some of the most common anti-patterns which causes bottlenecks in the data processing code of ML pipelines.

TABLE II

| | Time Taken (Sec) | | |
|---|---|---|---|
| Antipattern | Before acceleration | After acceleration | Speedup |
| Loop iterrows (ITER) | 740 | 0.0046 | 160,000x |
| Excessive Memory Copy (EMC) | 60 | 0.69 | 87x |
| Lengthy Operations (LLF) | 215 | 1.86 | 115x |
| Repeated Data Operations (MEM) | 327 | 1.3 | 250x |

Now referring to the Table II, some of the example anti-patterns considered in the present disclosure includes a Loop iterrows (ITER), an Excessive Memory Copy (EMC), a Lengthy Operations (LLF) and a Repeated Data Operations (MEM).

Loop iterrows (ITER—Loop Iteration over Rows): In order to process data points one by one using loops, the present disclosure utilizes Pandas (Python library) an iterable object over the data-frame using the iterrows function call. Table III shows a sample code snippet with loop using iterrows, performing the operation to multiply the entries of column price by the entries of column discount, and store the result in a new column price final. There is often an if-else condition also involved, as shown in the code snippet. Code in Table III takes around 740 seconds when executed over data containing around 500 k rows and 27 columns. When this code is replaced with the corresponding vectorized operation as shown in the code snippet in Table III the time was reduced to just 4.6 milliseconds, a speedup of almost 160,000× is achieved. It should be noted that the if-else condition is handled by "where" clause. Further, the code snippet was experimented without the "where" clause by putting the value for discount column as 0 when there is no discount, and it turned out to be even faster. The code with loop and iterrows, without if-else took 701 seconds while vectorized code just took 2 milliseconds. The vectorized code is almost 2 times faster when where is not used. Further, in another embodiment, the vectorized instructions were replaced with division operation in a similar situation, and the results were similar to the multiplication operation mentioned. The conversion from loop-iterrows to vectorized code works when the data to be operated upon is numeric (int, float, etc.) with arithmetic operation involved. When data is nonnumeric (string, textual), the vectorization of code does not give equivalent performance as with numeric data. In such cases apply (function name) is used. The experimentation proved that both the vectorized code and the code written using the apply function have a similar performance on non-numeric data. An option is to map the string data to numeric data whenever possible. For example, in the transactional data set, the nature of the interaction between a user and any product is captured as strings with values "view", "order", etc. If these strings are mapped to numeric values "view"=1, "order"=2, the processing involving comparison of interaction values can be significantly accelerated as vectorized instructions can be employed.

TABLE III

| | |
|---|---|
| code snippet with loop using iterrows (Slow code) | for index, rows in df.iterrows( ):<br>    if df.loc[ind,'discount_flag']==1:<br>        df.loc[index,'price_final']=df.loc[index,'price']*(1.0-<br>        df.loc[index,'discount']<br>    else:<br>        df.loc[ind,'price_final']= df.loc[index,'price'] |
| Vectorized code snippet (accelerated code) | df['price_final']=np.where(df['discount_flag']=1,<br>df.loc[index,'price']*(1.0-<br>df.loc[index,'discount']),df.loc[index,'price']) |

Excessive memory copying (EMC): A common usage in data frame operations is to process certain columns (of every row) of a data frame and store the processed result in a new column inside the function. This may lead to excessive memory transfer and hence execution time. For example, in Table IV, function is applied to every row of the data frame "df" and newly generated data is stored as a new column new column of the data frame "df". Here, the whole data frame is transferred twice for sending to and receiving from the function with every function call. The slow code snippet shown in Table IV takes around 77.4 seconds on data frame of size 500 k rows and 27 columns. The corresponding accelerated code given in Table IV takes only 3 seconds for the same amount of data i.e., a speedup of 25×. It can be seen that, though new data is still created inside the function, it is not stored in the new column of the data frame. Instead, this new data is returned and stored in the new data frame column outside the function.

TABLE IV

| | |
|---|---|
| code snippet EMC (Slow code) | def function(x,attr):<br>    data=[ ]<br>    for col in attr:<br>        data.append({'name':col,'value':x[col]})<br>    x['new_column'] = data<br>    return x<br>df = df.apply(function,args=[attr,],axis=1) |
| Accelerated code | def function(x,attr):<br>    data=[ ]<br>    for col in attr:<br>        data.append({'name':col,'value':x[col]})<br>    return data<br>df['new_column'] = df.apply(function,args=[attr,],axis=1) |

Lengthy operation as a Lambda Function (LLF): The apply method coupled with the lambda operation provides an easy way to apply several operations over a data frame and is often misused. Table V shows an example of such misuse, which takes around 747 seconds for a data frame of size 2 k rows and 27 columns. Here, the lambda function is employed to create a list of product attributes with the key as "productId". The code creates a new dictionary for every lambda function call. The creation of a large number of dictionaries causes unnecessary overhead. It can be seen that "productId" is repeated in the "df" data frame, which causes the same dictionary to be created again and again as product attributes do not change in this use case. Note that "prod df" is a separate data frame which contains "productId" and "Product attr" as columns.

In an embodiment, instead of using a lengthy operation with the lambda based approach, a separate function "fn" is defined in the present disclosure which utilizes a single dictionary for the whole operation as shown in Table V. The dictionary "d" is created only once, and product attribute entries are added only once per "productId". Thus, the function "fn" performs the same operation. However, it takes only 33 milliseconds after the dictionary is created in 20 milliseconds. The speedup is 14,000×.

TABLE V

| | |
|---|---|
| LLF (Slow code) | df['products']=df['products'].apply(lambda x:<br>[prod_df.set_index('productId').Product_attr.to_dict( )<br>[z] for z in x]) |
| Accelerated code | t1=tuple(prod_df['productId'])<br>t2=tuple(prod_df['Product_attr'])<br>d=dict(zip(t1 ,t2))<br>def fn(x):<br>    l=[d[z] for z in x]<br>    return l<br>df['products']=df['products'].apply(lambda x: fn(x)) |

Repeated Data operations (MEM): The code snippet shown in Table VI shows a typical operation involving data selection operation over data frames. The issue here is that function (line 1 in code snippet showing slow code) is called multiple times for same values of arguments (a, b, c, d). The data is selected from the data frame df using the values of passed arguments and returned as a list. This code takes around 327 seconds for a data frame of size 500 k rows. The time can be reduced by eliminating the repeated computations for the same arguments and using a cache for later usage. This is similar to "memoization," and certain libraries in python do provide facilities for this. The present disclosure used one such library known as "lru cache", which gave a 2× speedup (165 seconds). Upon analysis, it is found that on average, the arguments a and b are repeated only 1.96 times, hence, only 2× speedup. In cases where the average repetition of arguments is k, there is an expected speedup of k×.

In an embodiment, higher speedups can be achieved if the memoization is performed beforehand, i.e., even before the actual function is called. FIG. 6b shows the code snippet where a dictionary d is created beforehand with (a, b) as key and (c, d) as value. The dictionary creation requires a single iteration over the data frame, and it only takes 0.59 seconds. Once a dictionary is created, it can be used inside the function to serve the requests as shown in Table VI. After creating the dictionary, the function only requires only 0.71 seconds to execute, which is an acceleration of 250×. Acceleration factor includes the time taken to create the dictionary as well (327/(0.59+0.71)=250). There were two more similar cases in the ML pipeline implemented by the present disclosure, wherein the operations were repeated. The speedups achieved by creating a dictionary were 46× (reduced from 60 seconds to 1.28 seconds) and 90× (reduced from 215 seconds to 2.37 seconds).

TABLE VI

| | |
|---|---|
| MEM (Slow code) | def function(a,b,c,d):<br>    new_df= df.loc[(df['A']==a) & (df['B']==b)]<br>    item_list= new_df.loc[df['C']<c, 'D'].tolist( )<br>...<br>df['new_col'] = df[['A','B','C','D']].apply(lambda x:<br>    function(x[0], x[1], x[2], x[3]), axis=1) |
| Accelerated code | from collections import defaultdict<br>a=tuple(zip(df['A'],df['B']))<br>b=tuple(zip(df['C'],df['D']))<br>d=defaultdict(list)<br>for x in range(len(a)):<br>    d[a[x]].append(b[x])<br>def function(a,b,c,d):<br>    lst=d[(a,b)]<br>    item_list= [x[1] for x in lst if x[0]< c]<br>...<br>df['new_col'] = df[['A','B','C','D']].apply(lambda x:<br>    function(x[0], x[1], x[2], x[3]), axis=1) |

In another embodiment, some more anti-patterns identified and resolved by the present disclosure includes List intersection operation (LIO) and Image embedding creation (IMG).

List intersection operation (LIO): One of the modules in the ML pipeline involves an intersection between lists containing product-ids, i.e., given two lists lst1 and lst2, select those product-ids from list lst1 which are also present in list lst2. The product-ids can be repeated in lst1, and both the repetition and the order of occurrence are required to be preserved. Table VII shows a naive implementation of this operation. Here, the list result is created by iterating over lst1 to get individual product-id x and then checking whether x is present in lst2. List lst1 contains close to 35000 product-ids and list lst2 contains close to 700 product-ids. This implementation takes around 225 milli-seconds. This intersection operation between lists is repeated close to 2000 times in the code (for different lst1s and lst2s). Cumulatively, this operation takes 449.65 seconds and acts as a bottleneck. The time taken is attributed to the costly operation of checking the presence of product-id x in lst2. It can be seen that it is a double loop. If lst2 is converted to the dictionary before the intersection operation as shown in Table VII, the time taken is drastically reduced. Even after including time taken for the creation of the dictionary, the time taken by the operation is 3.3 milliseconds. Cumulatively, for 2000 repetitions, the reduced time is 6.6 seconds. The overall acceleration is thus 68×. Python also provides set operations that are faster than list based operations; however, due to repeated product-ids, using set operations is not possible.

TABLE VII

| LIO (Slow code) | result=[x for x in lst1 if x in lst2] |
| Accelerated code | d=dict(zip(lst2, lst2)) |
| | result=[x for x in lst1 if x in d.keys( )] |

Image embedding creation (IMG): In ML/Deep Learning (DL) pipelines, images are often converted to their corresponding embeddings (generally a vector of length 100) by using a pre-trained model. Once the images are converted to embeddings, the operations on images, such as finding similarity among images, grouping similar images, etc., can be performed faster. The embedding generation process is time-intensive as it involves forward pass over a vision-based DL model. In the pipeline of the present disclosure, the collected images were large (2400×1800 pixels), and over a CPU-based setup, embedding generation of a single image takes more than 2 seconds. When the embedding generation is performed in batches of 50, a significant speedup of 15× is achieved. From 2 seconds per image, the time is reduced to 130 milliseconds. Further, the present disclosure was experimented with generating the embeddings using smaller-sized images (80×60 pixels), scaled-down versions of larger images. The acceleration achieved was close to 30× with a minimal impact on the accuracy of the similarity operations.

Figure 4:
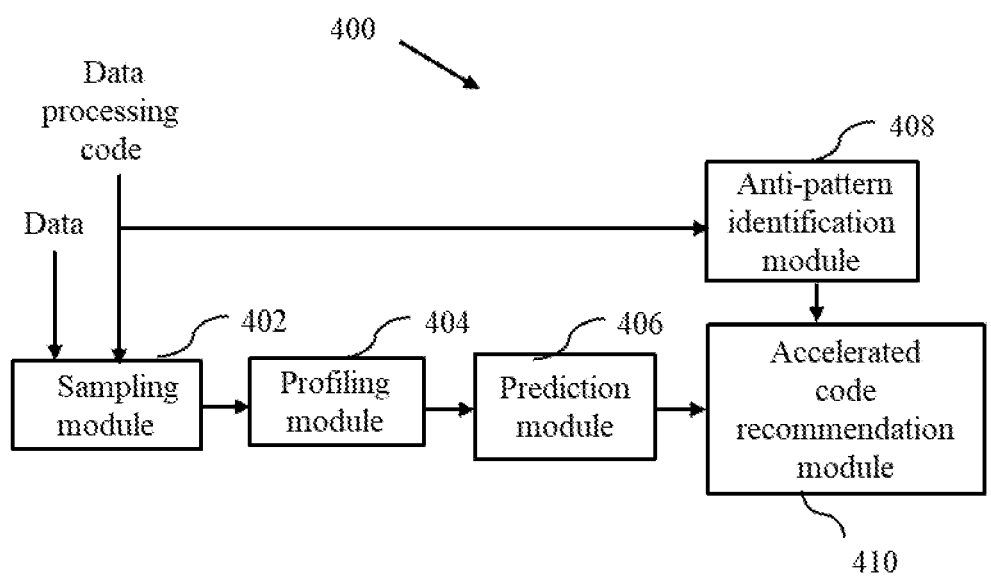
FIG. 4 is a functional architecture for the processor implemented method for scalable acceleration of data processing pipeline implemented by the system of FIG. 1, in accordance with some embodiments of the present disclosure.

FIG. 4 is a functional architecture 400 for the processor implemented method for scalable acceleration of data processing pipeline implemented by the system of FIG. 1, in accordance with some embodiments of the present disclosure. Now referring to FIG. 4, the functional architecture 400 includes a sampling module 402, a profiling module 404, a prediction module 406, an anti-pattern identification module 408 and an accelerated code generation module 410. the sampling module 402 receives the dataset and samples the dataset a plurality of sample datasets based on the predefined data sampling size using the sampling technique. The profiling module 404 obtains a plurality of performance parameters corresponding to each of the plurality of sample datasets based on the data processing code using the profiling technique. The prediction module 406 predicts a plurality of scalable performance parameters corresponding to each of a plurality of larger datasets based on the plurality of performance parameters and the data processing code using a curve fitting technique. The anti-pattern identification module simultaneously locates a plurality of anti-patterns in the data processing code using the pattern matching technique, wherein an anti-pattern is a short term solution prone to adverse consequences during long term usage. The accelerated code recommendation module 410 recommends the plurality of accelerated codes based on the plurality of anti-patterns and the predicted plurality of scalable performance parameters using an accelerated code recommendation technique.

Experimental results: The experimental setup includes a 64 GB RAM, 48 CPU cores. The software used are Python 3.6.9, scalene profiler 1.1.10, numpy 1.17.3, and pandas 0.25.

FIGS. 5A through 5E illustrate experimental results depicting performance of the processor implemented method for scalable acceleration of data processing pipeline implemented by the system of FIG. 1, in accordance with some embodiments of the present disclosure.

Figure 5A:
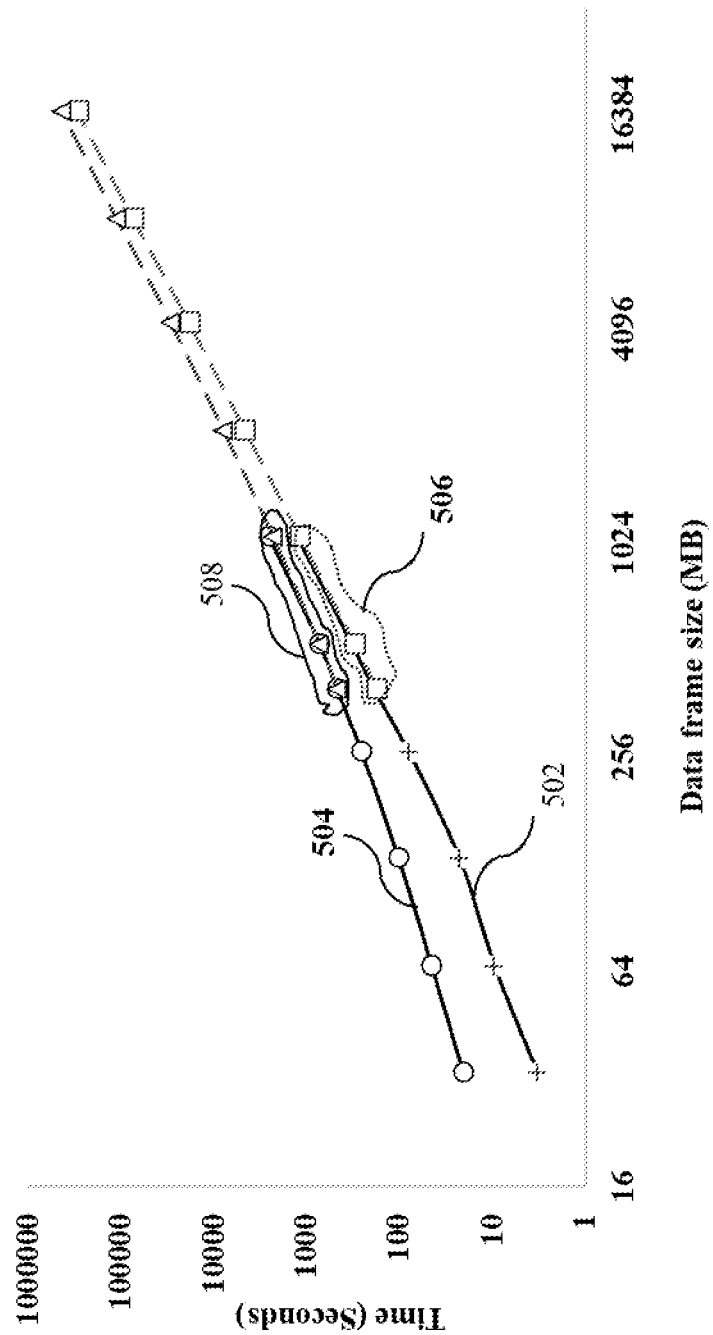
FIGS. 5A, 5B, 5C, 5D, and 5E illustrate experimental results depicting performance of the processor implemented method for scalable acceleration of data processing pipeline implemented by the system of FIG. 1, in accordance with some embodiments of the present disclosure.

In an embodiment, FIG. 5A illustrates prediction accuracy of a Performance Model. Now referring to FIG. 5A, the predicted values for two bottleneck modules MEM1 502 and ITER 504 are illustrated. The solid portion of the curves show the measured values and dotted portion of the curves shows the predicted values of MEM1 and ITER respectively. The graph also shows the exact measured and predicted values where the measured and predicted curves overlap at regions 506 and 508. It can be seen that the prediction error is less than 10%. Moreover, the graph also shows that the difference between the bottlenecks' processing times reduces when data size becomes large.

Figure 5B:
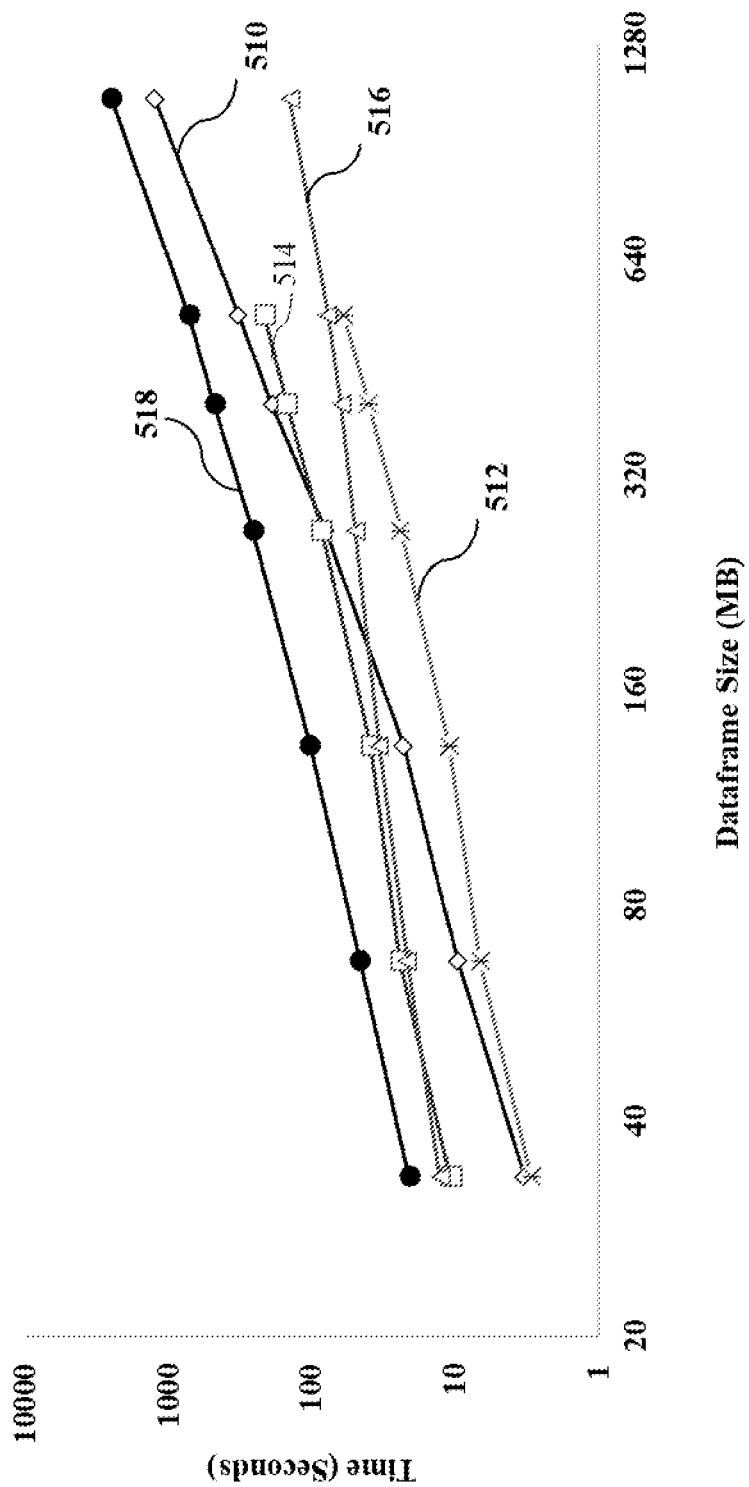

In an embodiment, FIG. 5B illustrates the time taken by the top 5 bottlenecks in the data preparation module. It should be noted that both X axis and Y axis, showing the data sizes and the processing times respectively, use a logarithmic scale. The topmost bottleneck is ITER—loop iterrows (see Table III for code snippet), which accounts for more than 50% of the total cumulative time taken by all 5 bottlenecks (MEM1 510, MEM2 512, MEM3 514, EMC 516 and ITER 518).

Among the remaining 4 bottlenecks, 3 belong to the MEM—repeated data operations anti-pattern (the sample code is shown in Table VI). The EMC—excessive memory copying bottleneck has the least impact on the scalability among the top 5 bottlenecks as its curve (516) has the least slope.

Figure 5C:
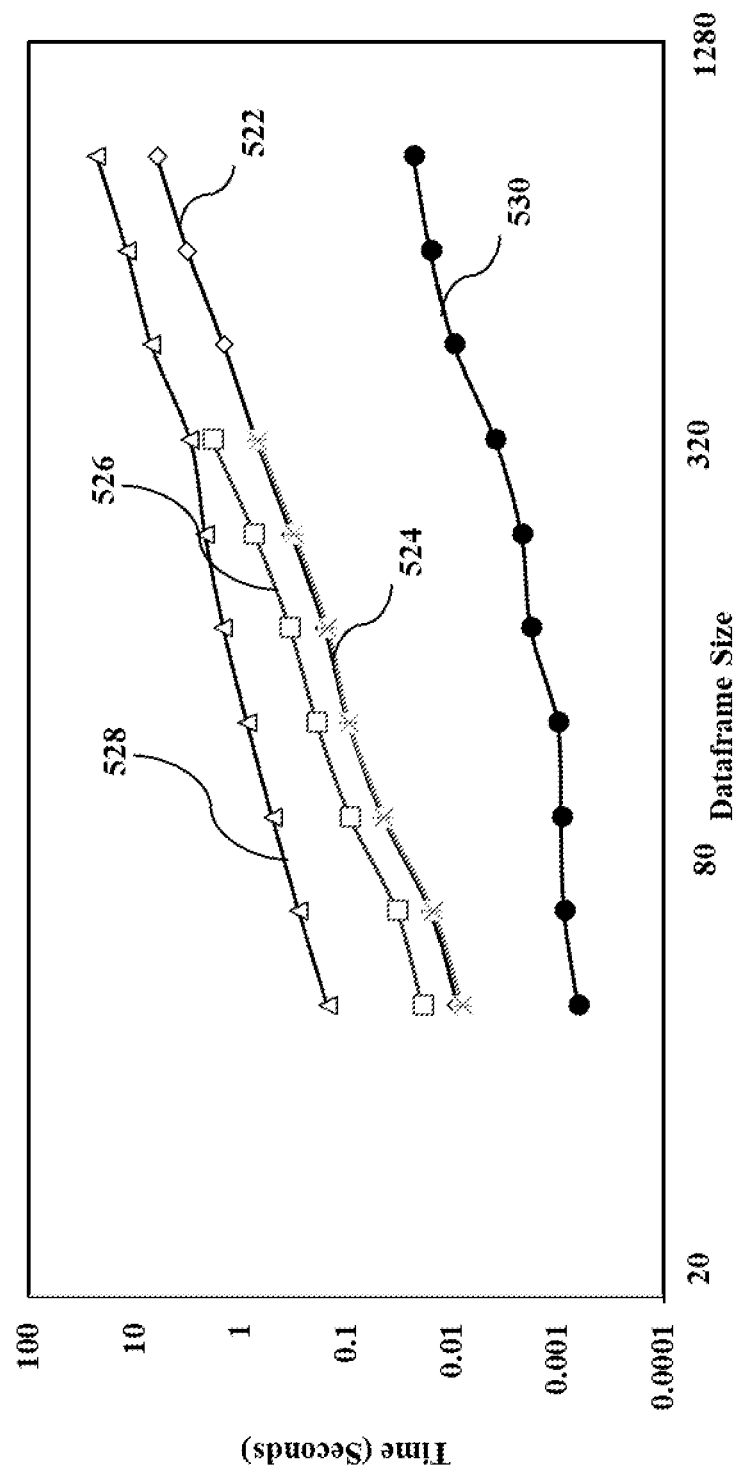

In an embodiment, FIG. 5C illustrates the accelerated versions of the bottlenecks shown in FIG. 5B. Apart from being more than 2 orders of magnitude faster than their slower versions, a striking point directly visible is that number of bottleneck inversions have been reduced to just 1.

In an embodiment, the accelerated modules pose a significantly lesser scalability challenge for the foreseeable data sizes as the slope for every curve is lesser than their unaccelerated counterparts. It should be noted that the range of X-axis in FIG. 5C is larger (0 to 4096 MB) than the graph in FIG. 10 (0 to 1280 MB). It can be seen that even for large data sizes, the time taken by the accelerated modules is manageable. The biggest bottleneck ITER is the one most accelerated. From being the one taking more than 50% of the cumulative times of top 5 bottlenecks (MEM1 522, MEM2

524, MEM3 526, EMC 528 and ITER 530), it now contributes for less than 0.1% of the accelerated cumulative time.

Figure 5D:
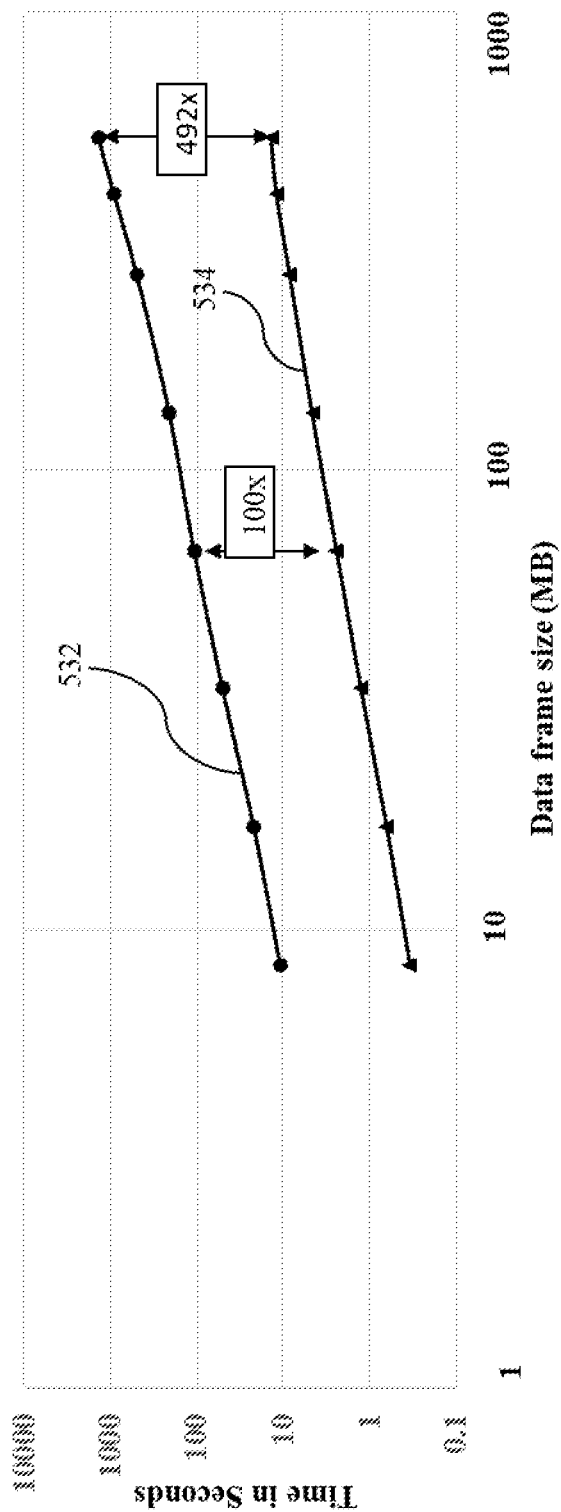

In an embodiment, Table VIII and FIG. 5D shows the cumulative times and acceleration achieved when the top five bottlenecks are accelerated. In figure, cumulative 532 refers to the cumulative time taken by the accelerated data preparation code. It can be seen that the scalability of the accelerated code 534 is much better than the unaccelerated code, as the slope of the orange curve is flatter than the blue one. The speedup ratio also increased from 58× for smaller data sizes to 492× for the larger data sizes.

TABLE VIII

| Data-frame size (MB) | Earlier cumulative time (Sec) | Accelerated cumulative time (sec) | Speedup |
| --- | --- | --- | --- |
| 8.35 | 10.88 | 0.186 | 58 |
| 33.4 | 50.72 | 0.680 | 74 |
| 133.6 | 210.55 | 2.101 | 100 |
| 534.4 | 1406.4 | 6.263 | 224 |
| 2137 | 14875 | 30.19 | 492 |

Figure 5E:
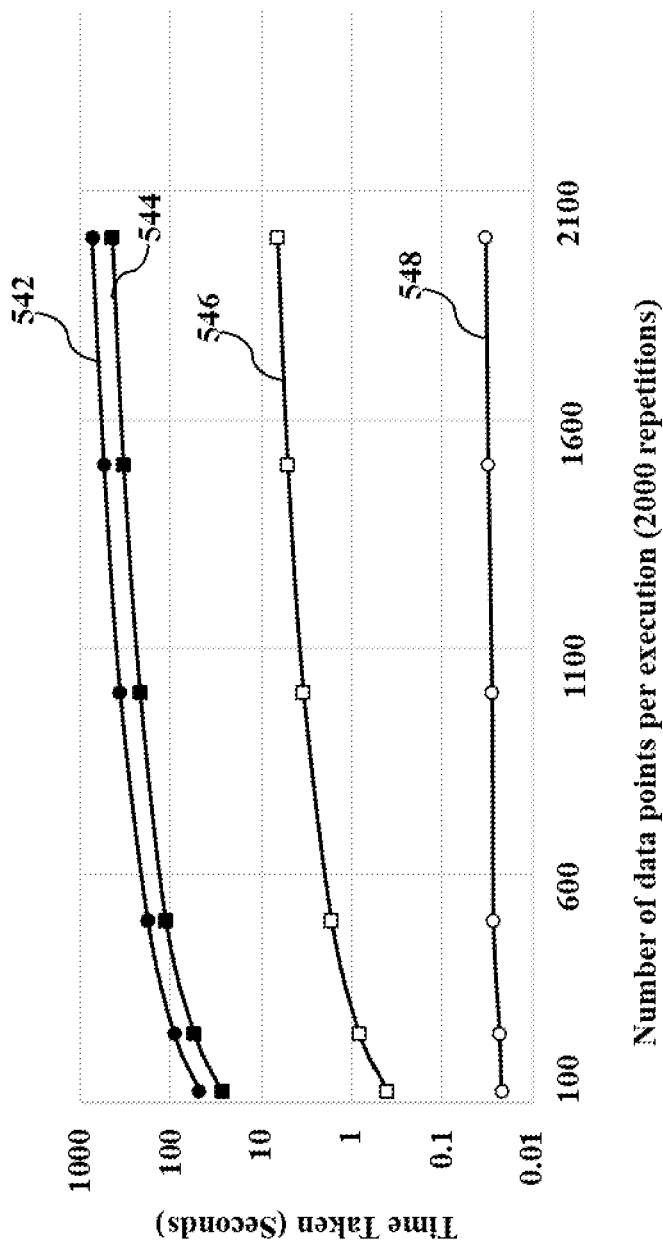

In an embodiment, FIG. 5E illustrates the acceleration achieved for the two data post processing bottlenecks (LLF, LIO) in the ML pipeline. It should be noted that the X-axis in FIG. 5E is not in logarithmic domain. The LIO (List intersection operation) gets accelerated by 67×, and the acceleration factor remains independent of the number of data points per execution. This is observed in FIG. 5E which represent the unaccelerated 544 and accelerated LIO 546 respectively, are almost parallel.

On the other hand, the speedup factor for the accelerated LLF 548 (lengthy operation as a lambda function) code increases with increasing data points per execution. This can be observed in FIG. 13 as the slope of the red curve representing the accelerated LLF 548 is much flatter than the curve, 542 which represents the unaccelerated LLF code.

Overall, the ML pipeline also contains modules for model training and inference, etc., which are not the target of acceleration by the present disclosure. It is observed based on the experimentation that the bottlenecks discussed above take 70% of the total time in the ML pipeline. Now, after acceleration, less than 5% of the total time is used by the said processing code. Overall speedup of ML pipeline achieved by accelerating the mentioned seven bottlenecks is around 3×.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiments of present disclosure herein address the unresolved problem of identifying performance bottlenecks early from the processing code and mitigating them with accelerated code to reduce data pre-processing time on larger data sizes. Both static and dynamic code analysis are performed on smaller data sets and the scalable performance parameters are predicted. Further, the present disclosure presented various performance anti-patterns and their accelerated versions using a bag of tricks. The accuracy of the present disclosure on larger data sizes is 90%.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
   receiving, by one or more hardware processors, a dataset and a data processing code, wherein the data processing code is implemented to transform the dataset from one format to another;
   obtaining, by the one or more hardware processors, a plurality of sample datasets based on the received dataset and a predefined data sampling size using a sampling technique, wherein the sampling technique performs a random sampling without replacement;
   obtaining, by the one or more hardware processors, a plurality of performance parameters corresponding to each of the plurality of sample datasets based on the data processing code using a first profiling technique, wherein the plurality of performance parameters comprises a computing time, a memory transfer time, a number of processor cores, a cache memory hierarchy, a cache size and a memory bandwidth, wherein the first profile technique outputs in a tuple form with a file name, a line number, a data size, the computing time, the memory transfer time for every line of data processing code on a particular data size, wherein a list of tuples for a complete data processing code for the particular data size is termed as a profile;
   predicting, by the one or more hardware processors, a plurality of scalable performance parameters corresponding to each of a plurality of larger datasets based on the plurality of performance parameters and the data processing code using a curve fitting technique, wherein the plurality of scalable performance parameters comprises a scalable computing time and a scalable memory transfer time, wherein the curve fitting technique builds models for predicting a processing time and assess scalability bottlenecks when the data size increases, wherein the scalable computing time and the scalable memory transfer time are computed for every line of code based on profiles for varied value of the data size and the curve fitting technique considers the number of processor cores, the cache memory hierarchy, the cache size and the memory bandwidth from the profile;
   simultaneously locating, by the one or more hardware processors, a plurality of anti-patterns in the data processing code using a pattern matching technique, wherein an anti-pattern is a short term solution prone to adverse consequences during a long term usage, wherein the pattern matching technique comprises a regular expression based pattern matching and a keyword based pattern matching; and
   recommending, by the one or more hardware processors, a plurality of accelerated codes based on the plurality of anti-patterns and the predicted plurality of scalable performance parameters using an accelerated code recommendation technique, wherein the accelerated code recommendation technique identifies a plurality of super-linear bottlenecks from the plurality of anti-patterns and recommends the corresponding accelerated code; and
   replacing, by the one or more hardware processors, the data processing code associated with the plurality of super-linear bottleneck with the accelerated code to accelerate overall data processing operation thereby reducing overall processing time, the memory requirement of the overall data processing operation.

2. The processor implemented method of claim 1, wherein the method of recommending the accelerated code based on the plurality of anti-patterns and the predicted plurality of scalable performance parameters using the accelerated code recommendation technique comprises:
   receiving the plurality of scalable performance parameters corresponding to each of the plurality of larger datasets and the plurality of anti-patterns;
   identifying a plurality of performance bottlenecks associated with the data processing code based on the plurality of scalable performance parameters and the located plurality of anti-patterns using a second profiling technique, wherein each of the plurality of performance bottlenecks are identified based on a change in computing time corresponding to an increase in data size;
   selecting the plurality of super-linear bottlenecks from the plurality of performance bottlenecks by sorting the plurality of performance bottlenecks in descending order based on a corresponding computing time, wherein the plurality of performance bottlenecks with the computing time greater than a predefined threshold are selected and, wherein each of the plurality of super-linear bottlenecks causes scalability problem; and
   recommending the plurality of accelerated codes corresponding to each of the plurality of super-linear bottlenecks based on an accelerated code lookup table, wherein the accelerated code lookup table comprises a plurality of bottlenecks and the plurality of accelerated codes corresponding to each of the plurality of bottlenecks.

3. A system comprising:
   at least one memory storing programmed instructions; one or more Input/Output (I/O) interfaces; and one or more hardware processors operatively coupled to the at least one memory, wherein the one or more hardware processors are configured by the programmed instructions to:
   receive a dataset and a data processing code, wherein the data processing code is implemented to transform the dataset from one format to another;
   obtain a plurality of sample datasets based on the received dataset and a predefined data sampling size using a sampling technique, wherein the sampling technique performs a random sampling without replacement;
   obtain a plurality of performance parameters corresponding to each of the plurality of sample datasets based on the data processing code using a first profiling technique, wherein the plurality of performance parameters comprises a computing time, a memory transfer time, a number of processor cores, a cache memory hierarchy, a cache size and a memory bandwidth, wherein the first profile technique outputs in a tuple form with a file name, a line number, a data size, the computing time, the memory transfer time for every line of data processing code on a particular data size, wherein a list of tuples for a complete data processing code for the particular data size is termed as a profile;

predict a plurality of scalable performance parameters corresponding to each of a plurality of larger datasets based on the plurality of performance parameters and the data processing code using a curve fitting technique, wherein the plurality of scalable performance parameters comprises a scalable computing time and a scalable memory transfer time, wherein the curve fitting technique builds models for predicting a processing time and assess scalability bottlenecks when the data size increases, wherein the scalable computing time and the scalable memory transfer time are computed for every line of code based on profiles for varied value of the data size and the curve fitting technique considers the number of processor cores, the cache memory hierarchy, the cache size and the memory bandwidth from the profile;

simultaneously locate a plurality of anti-patterns in the data processing code using a pattern matching technique, wherein an anti-pattern is a short term solution prone to adverse consequences during a long term usage, wherein the pattern matching technique comprises a regular expression based pattern matching and a keyword based pattern matching; and recommend a plurality of accelerated codes based on the plurality of anti-patterns and the predicted plurality of scalable performance parameters using an accelerated code recommendation technique, wherein the accelerated code recommendation technique identifies a plurality of super-linear bottlenecks from the plurality of anti-patterns and recommends the corresponding accelerated code; and replace the data processing code associated with the plurality of super-linear bottleneck with the accelerated code to accelerate overall data processing operation thereby reducing overall processing time, the memory requirement of the overall data processing operation.

4. The system of claim 3, wherein the method of recommending the accelerated code based on the plurality of anti-patterns and the predicted plurality of scalable performance parameters using the accelerated code recommendation technique comprises:

receiving the plurality of scalable performance parameters corresponding to each of the plurality of larger datasets and the plurality of anti-patterns;

identifying a plurality of performance bottlenecks associated with the data processing code based on the plurality of scalable performance parameters and the located plurality of anti-patterns using a second profiling technique, wherein each of the plurality of performance bottlenecks are identified based on a change in computing time corresponding to an increase in data size;

selecting the plurality of super-linear bottlenecks from the plurality of performance bottlenecks by sorting the plurality of performance bottlenecks in descending order based on a corresponding computing time, wherein the plurality of performance bottlenecks with the computing time greater than a predefined threshold are selected and, wherein each of the plurality of super-linear bottlenecks causes scalability problem; and recommending the plurality of accelerated codes corresponding to each of the plurality of super-linear bottlenecks based on an accelerated code lookup table, wherein the accelerated code lookup table comprises a plurality of bottlenecks and the plurality of accelerated codes corresponding to each of the plurality of bottlenecks.

5. One or more non-transitory machine-readable information storage mediums comprising one or more instructions which when executed by one or more hardware processors cause:

receiving a dataset and a data processing code, wherein the data processing code is implemented to transform the dataset from one format to another;

obtaining a plurality of sample datasets based on the received dataset and a predefined data sampling size using a sampling technique, wherein the sampling technique performs a random sampling without replacement;

obtaining a plurality of performance parameters corresponding to each of the plurality of sample datasets based on the data processing code using a first profiling technique, wherein the plurality of performance parameters comprises a computing time, a memory transfer time, a number of processor cores, a cache memory hierarchy, a cache size and a memory bandwidth, wherein the first profile technique outputs in a tuple form with a file name, a line number, a data size, the computing time, the memory transfer time for every line of data processing code on a particular data size, wherein a list of tuples for a complete data processing code for the particular data size is termed as a profile;

predicting a plurality of scalable performance parameters corresponding to each of a plurality of larger datasets based on the plurality of performance parameters and the data processing code using a curve fitting technique, wherein the plurality of scalable performance parameters comprises a scalable computing time and a scalable memory transfer time, wherein the curve fitting technique builds models for predicting a processing time and assess scalability bottlenecks when the data size increases, wherein the scalable computing time and the scalable memory transfer time are computed for every line of code based on profiles for varied value of the data size and the curve fitting technique considers the number of processor cores, the cache memory hierarchy, the cache size and the memory bandwidth from the profile;

simultaneously locating a plurality of anti-patterns in the data processing code using a pattern matching technique, wherein an anti-pattern is a short term solution prone to adverse consequences during a long term usage, wherein the pattern matching technique comprises a regular expression based pattern matching and a keyword based pattern matching; and recommending a plurality of accelerated codes based on the plurality of anti-patterns and the predicted plurality of scalable performance parameters using an accelerated code recommendation technique, wherein the accelerated code recommendation technique identifies a plurality of super-linear bottlenecks from the plurality of anti-patterns and recommends the corresponding accelerated code; and replacing the data processing code associated with the plurality of super-linear bottleneck with the accelerated code to accelerate overall data processing operation thereby reducing overall processing time, the memory requirement of the overall data processing operation.

6. The one or more non-transitory machine-readable information storage mediums of claim 5, wherein the method of recommending the accelerated code based on the plurality of anti-patterns and the predicted plurality of scalable performance parameters using the accelerated code recommendation technique comprises:

receiving the plurality of scalable performance parameters corresponding to each of the plurality of larger datasets and the plurality of anti-patterns;

identifying a plurality of performance bottlenecks associated with the data processing code based on the plurality of scalable performance parameters and the located plurality of anti-patterns using a second profiling technique, wherein each of the plurality of performance bottlenecks are identified based on a change in computing time corresponding to an increase in data size;

selecting the plurality of super-linear bottlenecks from the plurality of performance bottlenecks by sorting the plurality of performance bottlenecks in descending order based on a corresponding computing time, wherein the plurality of performance bottlenecks with the computing time greater than a predefined threshold are selected and, wherein each of the plurality of super-linear bottlenecks causes scalability problem; and recommending the plurality of accelerated codes corresponding to each of the plurality of super-linear bottlenecks based on an accelerated code lookup table, wherein the accelerated code lookup table comprises a plurality of bottlenecks and the plurality of accelerated codes corresponding to each of the plurality of bottlenecks.

\* \* \* \* \*